Aug. 6, 1968 A. GOZLAN 3,395,539
COMBINED TURBO-JET AND RAM-JET ENGINE WITH INJECTION OF OXYGEN
Filed July 25, 1966 3 Sheets-Sheet 1

Inventor:
Albert Gozlan
By Karen W. Flocks
attorney

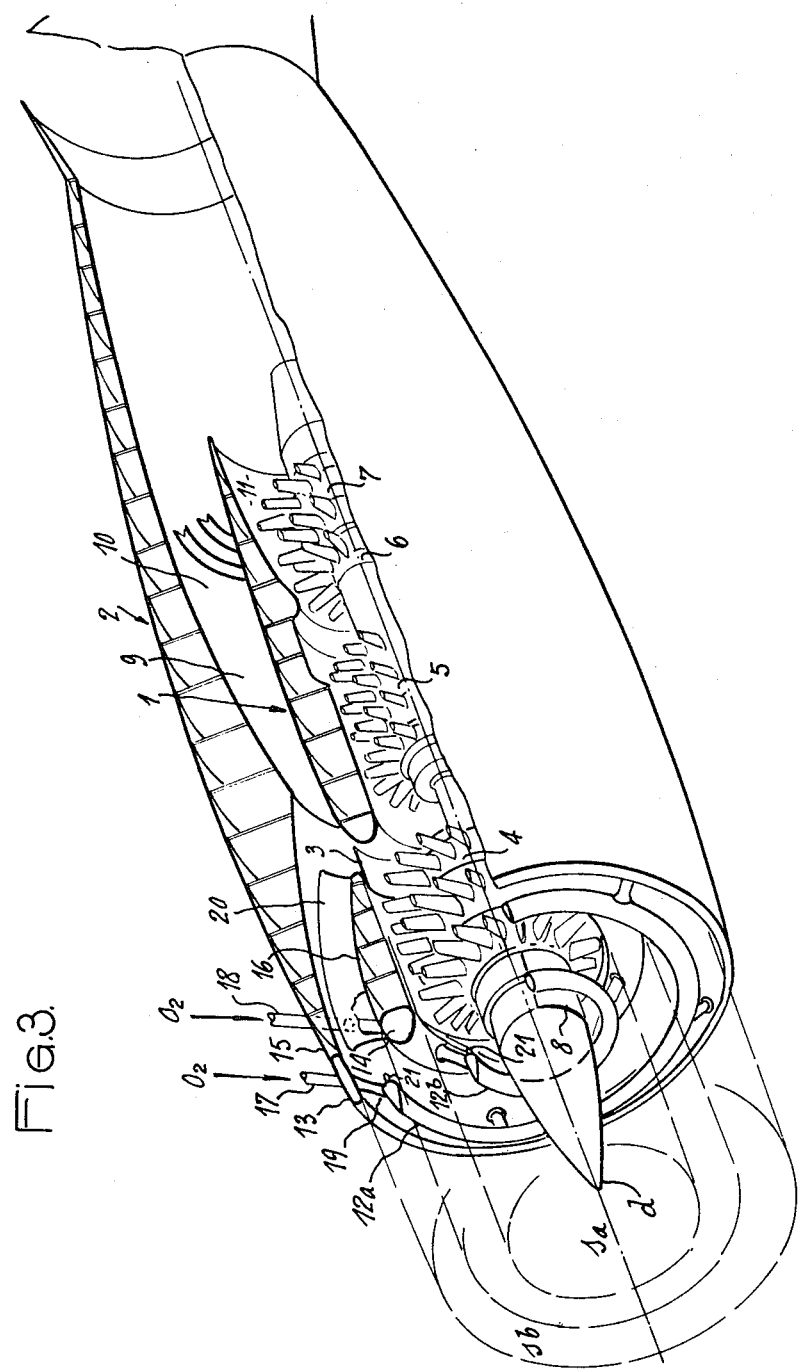

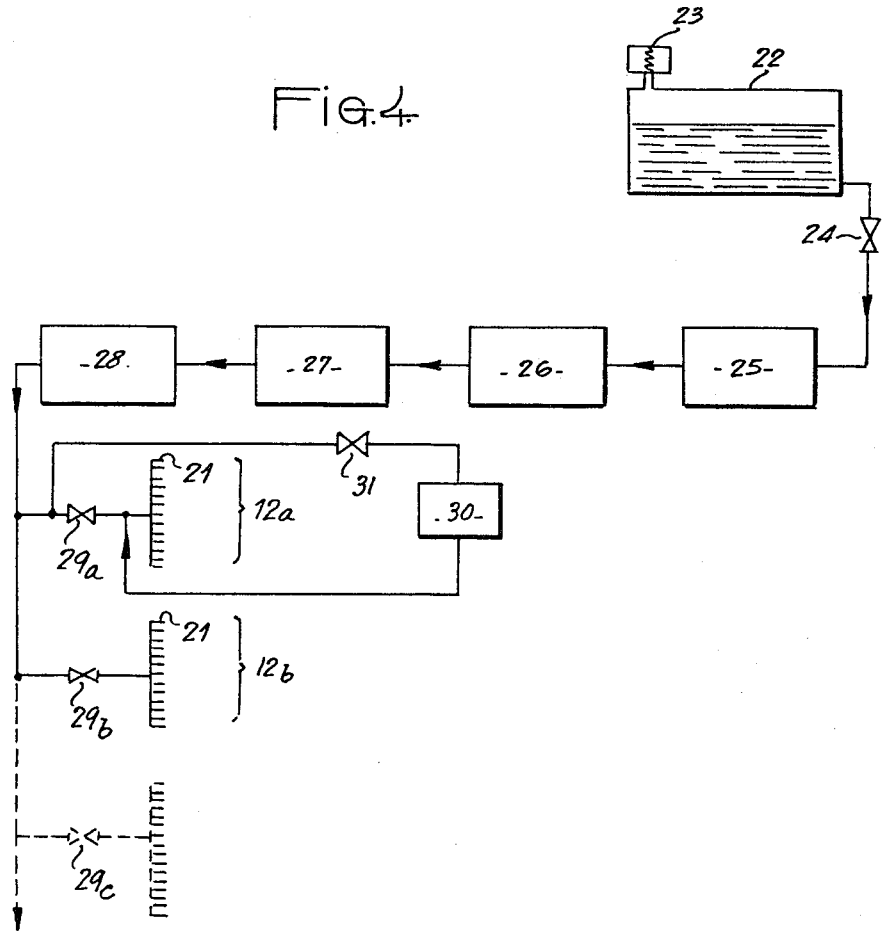

3,395,539
COMBINED TURBO-JET AND RAM-JET ENGINE WITH INJECTION OF OXYGEN
Albert Gozlan, Asnieres, France, assignor to Nord-Aviation Societe Nationale de Constructions Aeronautiques, Paris, France, a joint-stock company of France
Filed July 25, 1966, Ser. No. 567,432
Claims priority, application France, July 29, 1965, 26,562
6 Claims. (Cl. 60—244)

ABSTRACT OF THE DISCLOSURE

A combination turbo-ram-jet unit of the coaxial double flux type having means associated with it for supplying liquid or gaseous oxygen or other combustion-supporting fuel to one and/or the other flux corresponding on the one hand to the turbo-jet and on the other to the ram-jet to augment the thrust by increasing the possible flow-rate of oxygen or combustion supporting fluid and in addition to effect a cooling action on certain parts of the turbo-ram-jet engine through heat exchange of the flowing oxygen or combustion-supporting fluid. The means for supplying the oxygen are constituted by tubular racks concentric with the axis of the turbo-ram-jet arranged at the air intake of the propulsion unit of the path of the fluxes passing through the turbo-jet and ram-jet.

---

The present invention relates to a combined turbo-jet and ram-jet engine, or turbo-ram-jet, with injection of oxygen in the liquid or gaseous form.

Propulsion units known as turbo-ram-jets which are required to work in the atmosphere over a very wide range of speeds or Mach numbers have their combustion characteristics very considerably affected according to the point of flight considered. In addition, the temperature of their constituent members develops rapidly with speed until it becomes dangerous at high speeds.

In these types of "atmospheric" propulsion units, while the fuel can always be introduced into the combustion chamber in adequate quantities, this is not the case with the combustion-supporting fluid which must be extracted from the surrounding medium. Now, it is known that the maximum quantity of air which can be supplied depends on the one hand on the section of the intake and also on the speed of movement of the said propulsion units, and on the other hand on the density of the ambient medium in which they move.

When these propulsion units are fitted on machines operating at high speeds and at high altitudes, and therefore in regions of low atmospheric density, it is known that, for normal combustion, an increase in thrust can only be obtained by an increase of the flow-rate of air resulting from an increased intake section, and that this increase in section will rapidly render the volume and in consequence the weight of these propulsion units prohibitive.

The solutions which comprise air intakes of variable section only provide furthermore a relatively small increase in power as compared with the considerable possibilities offered by enrichment of the oxygen content of the combustion air. In addition, the various constituent parts of the propulsion units can then be subjected to a suitable temperature when the additional supply of oxygen is effected in the liquid form.

In consequence, the present invention has for its object to provide a turbo-ram-jet engine with injection of oxygen which permits contrary to the conventional combinations, and independently or in combination:

An increase of the content of oxygen in the air passing into the turbo-ram-jet, so as to increase the flow-rate of fuel and in consequence, the thrust;

Cooling of the constituent parts of the propulsion units, such that the said parts are never exposed to temperatures liable to adversely affect their correct operation.

To this end, the turbo-ram-jet unit of the coaxial double flux type is essentially characterized by the fact that there are associated with it means for supply liquid or gaseous oxygen or any other combustion-supporting fluid to one and/or the other flux corresponding on the one hand to the turbo-jet and on the other to the ram-jet, so that the thrust of the turbo-ram-jet is augmented by increasing the possible flow-rate of oxygen or combustion-supporting fluid, and that it is possible independently or simultaneously to effect a cooling action on certain parts of the turbo-ram-jet engine.

In addition, the means for supplying liquid or gaseous oxygen or any other combustion-supporting fluid are constituted by tubular racks concentric with the axis of the turbo-ram-jet, these racks being arranged at the air intake of the propulsion unit on the path of the main flux passing through the turbo-jet and/or of the flux passing through the ram-jet.

Other advantages and characteristic features of the present invention will be brought out in the description which follows below, reference being made to the accompanying drawings, in which:

FIG. 3 is a partial diagrammatic view in perspective and in longitudinal cross-section of a combination by-pass turbo-ram-jet engine equipped according to the invention with oxygen-injection racks.

FIG. 4 is a diagram showing the distribution and supply circuit of the oxygen.

Figure 1:
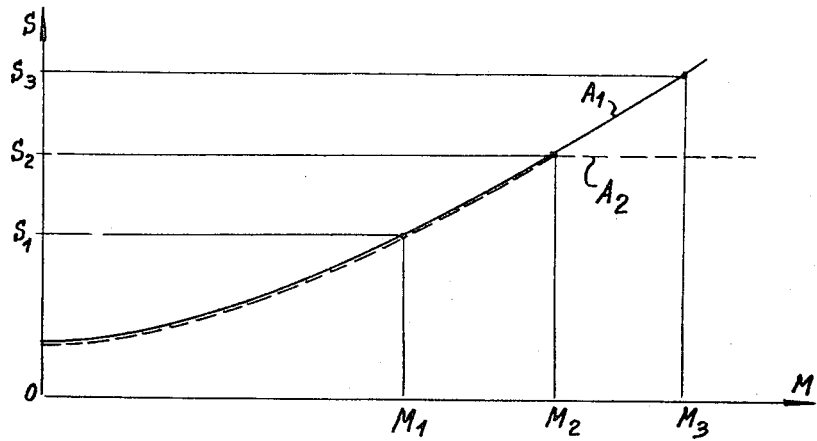
FIG. 1 is a diagram showing the theoretical law of variation of the air-intake section S of a turbo-ram-jet as a function of its speed M.

In FIG. 1, the curve $A_1$ representing the increase in the air-intake section S of a turbo-ram-jet as a function of its speed M shows that, for a given type of propulsion unit flying at a given altitude and with natural combustion, that is to say which is effected with ambient air, the speed M is governed by the air-intake section S, that the said air-intake section can be increased to a maximum $S_2$ corresponding to a speed $M_2$, but that for a speed $M_3$, the corresponding section will be located at $S_3$, that is to say at a point moving further away from $S_2$ at which the weight/power ratio has an optimum value.

Figure 2:
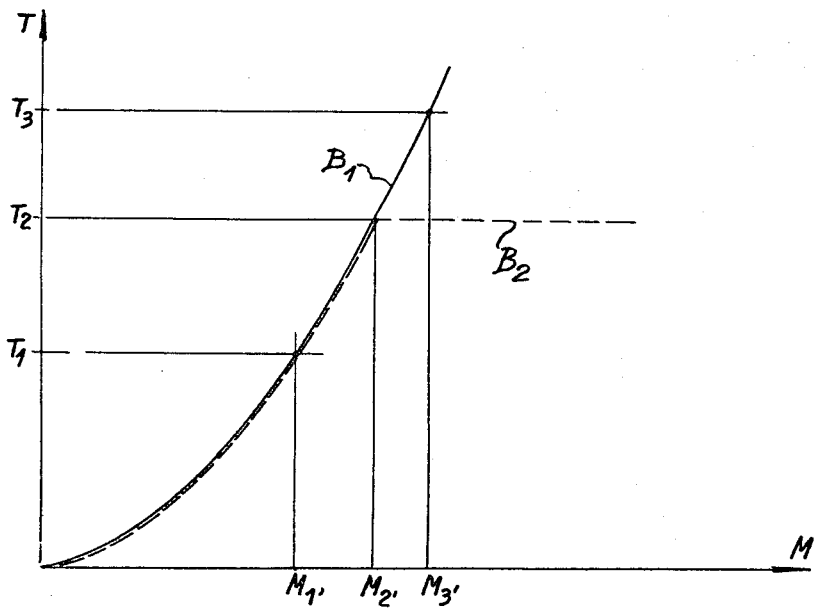
FIG. 2 is a diagram showing the theoretical law of the evolution of the temperature generated in the propulsion unit as a function of the speed of passage of the air in the turbo-ram-jet.

Similarly, in FIG. 2, the curve $B_1$ representing the increase of the temperature generated T as a function of the speed of the air passing through the propulsion unit when it operates under the same conditions, shows that the speed $M_1$ will generate a temperature $T_1$ and that this temperature may, within the normal limits of operation of the propulsion unit, be increased to $T_2$ by a speed $M'_2$, but that any increase beyond this speed, up to $M'_3$ for example, will result in damage to the propulsion unit.

In a turbo-ram-jet such that shown diagrammatically and by way of example in FIG. 3, a double flux turbo-jet unit 1 has been installed coaxially with a ram-jet 2, and a diaphragm 3 of any desired type (with a partition, flap or moving sliding ring, for example), is placed between the low-pressure compressor 4 and the high-pressure compressor 5 which are respectively driven by the turbines 6 and 7. A closure device 8 enabling the air-intake sections $S_a$ of the turbo-unit to be varied (retractable fairing, for example) can be arranged at the intake of the turbo-jet unit, together with diffuser $d$.

For normal conditions of operation, any actuation of the diaphragm 3 and/or the device 8 will have the result that the primary and secondary air fluxes of the turbo-jet and/or the air flux of the ram-jet can be directed in any proportions either into the annular channel 9 of the ram-jet in order to be introduced into the combustion chamber 10, or to the exhaust nozzle 11. At high speeds, the turbo-jet unit is entirely isolated, and only the ram-jet unit is in operation, traversed by the ram-jet flux only.

While it is easy to design a propulsion unit of this type having an air-intake section S which may be variable if so desired, which can be defined in such manner that the sum of the section $S_a$ of the turbo-jet flux and of the section $S_b$ of the ram-jet flux permits the said propulsion unit to reach the point $(M_2, S_2)$ in FIG. 1 it would on the contrary be inoperative to wish to operate this propulsion unit beyond this point. Furthermore, the limit of kinetic heating, shown by the point $(M'_2, T'_2)$ in FIG. 2 would in practice prevent operation beyond $M_2, S_2$.

According to the preferred form of construction of the invention, the turbo-ram-jet shown in FIG. 3 is provided in its front portion with two tubular racks $12a$, $12b$ comprising oxygen injectors and arranged concentrically to the propulsion unit, so that the said racks are located at the inlet of the turbo-jet and ram-jet fluxes. These racks are in communication with distribution chambers 13, 14 formed respectively in the outer fairing 15 and in the central fairing 16. The supply conduits 17, 18 pass respectively inside the supports 19 of the racks and of the transverse fairing 20.

These racks, which are provided with injectors 21, can inject jets of liquid or gaseous oxygen either into the turbo-jet flux or into the ram-jet flux, or simultaneously into both fluxes, by means of the distribution circuit shown by way of example in FIG. 4. The path of the oxygen from the heat-insulated tank 22, provided at its upper part with an excess pressure valve 23, is effected through a motor-driven gate-valve 24 of the fire-break type, a turbo-pump 25, a filter 26, a flow-meter control and totalling apparatus 27, a flow-regulator 28 and electric stop-valves $29a$, $29b$, $29c$.

The injection of oxygen, which is normally effected in the form of a liquid sprayed in the injectors 21 can also be effected in the gaseous form after it has been previously caused to carry out a cooling function in a device such as for example a heat exchanger 30 (FIG. 4). In this case, an isolating gate-valve 31 puts the exchanger in the cooling circuit.

Under these conditions, the injection of oxygen is truly subsituted for the increase in the air-intake section of the propulsion unit, so that it is then possible to increase the point M of the curve of FIG. 1 beyond $M_2$ and following the curve $A_2$, and that in this case the limitation of speed is only subordinated to the quantity of oxygen injected, this quantity being furthermore as great as may be desired.

Similarly, the increase of speed will no longer be damaging for the propulsion unit parts, and the temperature $T_2$ of the curve $B_2$ of FIG. 2 will be maintained constant in spite of the increase in M.

Depending on local conditions of flight, it is also possible to act through the intermediary of control valves on the selection of the set to be supplied with oxygen (turbo-jet or ram-jet), or on the proportion of oxygen to be applied to them. Similarly, the distribution of oxygen may be uniform or non-uniform, the latter case permitting for example a more powerful cooling of the fluxes by coming into contact with certain walls, or alternatively, if it is desired to re-generate a cooler flow in spite of the mixtures between the various layers of the flow, the circuit and the design of the racks being adapted correspondingly.

In conclusion, the present invention relates to an injection of oxygen into a turbo-ram-jet engine, the said injection being effected into one or the other or both the ram-jet and turbo-jet fluxes in a liquid or gaseous form at points which, with respect to the main air intake, are located upstream or downstream of the plane of the lips of the fairing which separates the fluxes.

It will of course be understood that the present invention has only been described and shown purely by way of explanation and not in any limitative sense and that any modification of detail may be made thereto without thereby departing from its scope.

In particular, a turbo-jet unit may have a single or double flux or may be of any other design, the invention being equally applicable to turbo-prop engines, turbo-fans and other known propulsion units.

The number, the arrangement and the design of the injector racks on the one hand and of the control valves on the other, together with the division into segments of the racks intended to obtain a selective distribution of the oxygen or of the combustion-supporting fluid employed, are adapted to each individual case.

I claim:

1. A combined turbo-jet and ram-jet engine with a double flux, comprising supply racks for the injection of combustion-supporting fluid of the liquid oxygen type, said racks being arranged concentrically to the axis of said combined turbo-jet-ram-jet on the path of the main flux passing through the turbo-jet and on the path of the flux passing through the ram-jet, and being provided with injectors at their periphery, whereby the thrust of said combination is increased by augmentation of the total possible flow-rate of combustion-supporting fluid.

2. A combined turbo-jet and ram-jet engine with a double flux, comprising supply racks for injecting combustion-suporting fluid of the liquid oxygen type, said racks being disposed concentrically to the axis of said combined turbo-jet-ram-jet engine at the intake of the propulsion unit, respectively on the path of the main flux passing through the turbo-jet and on the path of the flux passing through the ram-jet, and said racks being provided with injectors at their periphery, whereby the thrust of said combination is increased by augmentation of the total possible flow-rate of combustion-supporting fluid.

3. A combined turbo-jet and ram-jet engine with a double flux as claimed in claim 2, in which said combination further comprises means for regulating respectively the useful air-intake section of the turbo-jet and means for regulating the section of the passage channels of the secondary flux of said turbo-jet towards the flux of the ram-jet.

4. A combined turbo-jet and ram-jet engine with a double flux comprising racks for supplying combustion-supporting fluid of the liquid oxygen type, said racks being disposed concentrically to the axis of said combined turbo-jet-ram-jet engine at the inlet of the prolusion unit, respectively on the path of the main flux passing through the turbo-jet and on the path of the flux passing through the ram-jet, and said racks being provided with injectors at their periphery, and means for regulating respectively the useful air-intake section in said turbo-jet and means for regulating the section of the passage channels of the secondary flux of said turbo-jet towards the flux of said ram-jet unit; and distribution chambers for the combustion-supporting fluid arranged respectively in the outer casing of the ram-jet unit and inside the casing of the turbo-jet unit, whereby the thrust of said combination is increased by augmentation of the total possible flow-rate of combustion-supporting fluid, said means for supplying combustion-supporting fluid in liquid form permitting selective cooling of certain members of said combined turbo-jet and ram-jet engine by the passage of a current of fluid over said members.

5. A combined turbo-jet and ram-jet engine as claimed in claim 4, in which the distribution circuit of the combustion-supporting fluid of the liquid oxygen type comprises at least one heat-insulated tank, the usual pumping and filtering means, gate-valves and control electro-valves, flow-rate regulators and means for controlling the flow-rate of the combustion-supporting fluid employed together with means for selecting the flux to be supplied with said fluid.

6. A combined turbo-jet and ram-jet engine as claimed in claim 4, in which the distribution circuit of the combustion-supporting liquid further comprises at least one heat-exchanger, whereby the racks supplying the combustion-supporting fluid are fed with gaseous fluid obtained by passing said combustion-supporting liquid into said heat-exchanger.

References Cited

UNITED STATES PATENTS

| | | | |
|---|---|---|---|
| 2,716,329 | 8/1955 | Lunger | 60—244 |
| 2,821,350 | 1/1958 | Smurik | 60—244 |
| 3,161,018 | 12/1964 | Sandre | 60—39.33 |
| 3,229,459 | 1/1966 | Cervenka | 60—39.33 |
| 3,296,800 | 1/1967 | Keenan | 60—244 |

MARTIN P. SCHWADRON, *Primary Examiner.*

DOUGLAS HART, *Assistant Examiner.*